Nov. 14, 1939.   C. H. VOGT   2,179,676

HAM PACKAGE AND METHOD OF MAKING SAME

Filed July 3, 1937

Inventor
Charles H. Vogt
By Strauch & Hoffman
Attorneys

Patented Nov. 14, 1939

2,179,676

UNITED STATES PATENT OFFICE 2,179,676

HAM PACKAGE AND METHOD OF MAKING SAME

Charles H. Vogt, Philadelphia, Pa., assignor to Modern Food Process Company, Philadelphia, Pa., a corporation of Delaware Application July 3, 1937, Serial No. 151,925

2 Claims. (Cl. 99—108)

This invention relates to a novel meat package and to a method of packaging meat for the market. More particularly, the invention relates to an improved boiled ham packed in a can and to a method of handling the constituents of the ham so that the product may be reshaped from its natural form and conveniently manufactured, in the form of a solid compact loaf of uniform quality from end to end disposed in a can so as to snugly fit therein and is an improvement over the invention disclosed in my Patent No. 1,503,864 dated August 5, 1924 for Meat product and method of making the same.

This invention aims to can ham or like pork products, by cutting the prime portions of the meat to pieces of about the size of a hen's egg, and coating said pieces with comminuted pelvic or hock portions in sufficient amount to bind the prime portions together, utilizing the rigid walls of the can to assist in uniting the pieces and comminuted particles into a solid piece of ham.

A further object of the invention is to provide an improved method of preparing pork products for the market, consisting in forming a mixture of the more desirable portions of a ham or like pork product, cut into pieces of a relatively large size, such as a hen's egg, for example, and comminuted particles of the less desirable or gelatinous portions of the ham, such as the hock or pelvic portions, mixed with the larger portions so as to bind said portions together, the mixture being stuffed progressively into a can that serves as the package for the mixture, and a receptacle for the product while it is cooked and chilled.

Another object of the invention is to provide a cooked ham or like pork loaf consisting of relatively large pieces of the more desirable portions of the meat, bound together by comminuted particles of the less desirable portions of the meat, all combined and packaged as a unit in a vacuum sealed can snugly embracing the loaf.

Another object of the invention is to provide an improved method of packaging a ham or like food product including the step of stuffing the product, consisting of relatively large pieces of meat, bound together, in a can, that moves with the product as it is formed, to the end that the can serves to mold and compact the meat.

Another object of the present invention is to provide a method of packaging a cooked ham or like pork product in a can, lined with parchment, and having a piece of smoked ham or bacon rind associated therewith as an integral part to enhance the flavor of the product.

Still another object of the present invention is to provide a packaged ham or like pork product consisting of relatively large pieces of the more desirable portions of the meat, and comminuted particles of the less desirable portions of the meat, all combined as a unit with a piece of smoked pork rind and packaged in a can.

Still further objects of the invention will appear as a description thereof proceeds with reference to the accompanying drawing in which, Figure 1 is a fragmentary side elevational view of the nozzle of a sausage stuffing machine showing the mode of packaging the food product of the present invention.

Like reference characters indicate like parts throughout the several figures.

Figure 1:
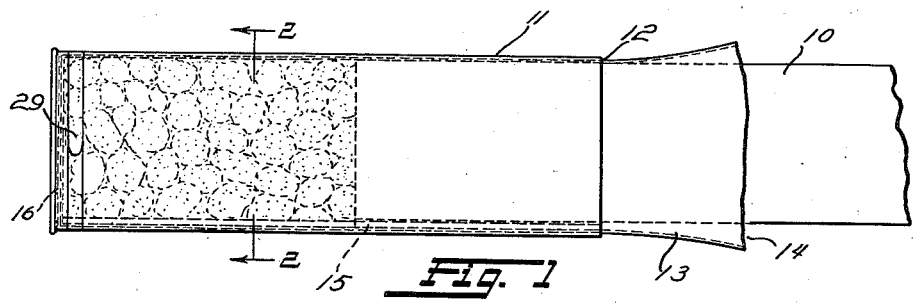
Figure 2:
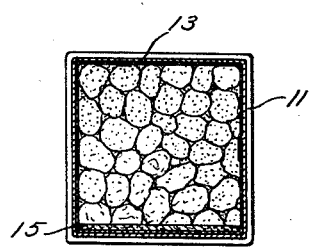
Figure 2 is a cross-sectional view taken on the plane indicated by the line 2—2 in Figure 1, looking in the direction of the arrows.
Figure 3:
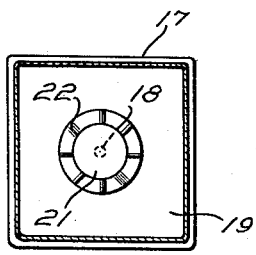
Figures 3 and 4 are plan and side elevational views of the vented closure member used to close the open end of the can shown in Figure 1.
Figure 4:
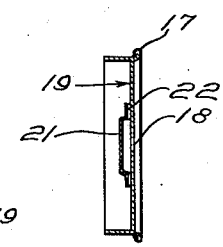

In carrying out the present invention, the inferior meat of the hock and pelvic portions of a ham or similar pork product is separated from the more desirable meat of the central portions thereof. The latter is preferably cut into pieces the size of a walnut or of a hen's egg, while the hock and pelvic portions are ground up in any suitable manner into comminuted form. The comminuted portions include gelatinous substances which serve as a binder for the larger pieces. The comminuted particles and the larger pieces of meat are then separately cured as described in my patent above referred to, or in any other approved manner.

After the meat has been cured, the large pieces of the central portion thereof, the comminuted pelvic or hock portions and the knuckle of the ham, which is chopped to a fine consistency, are placed in a suitable mixing machine and the entire mass agitated so that the comminuted particles are distributed over the larger pieces and serve to substantially cover them. The mixture is then placed in a machine, such as a sausage stuffing machine, having a nozzle 10 of a suitable size, through which the large pieces of meat, covered with the comminuted particles are caused to flow under pressure.

The large pieces predominate vastly in the mixture, about ninety per cent being made up of the large pieces. The remaining ten per cent of comminuted gelatinous particles serve to merely provide a binder to eventually firmly unite the large pieces into one solid piece of ham.

A suitable can 11 having an open end 12 and a parchment lining 13, having an open end 14 coincident with the open end 12 of can 11 is used to package the meat. A piece of smoked ham or bacon rind 15 is preferably placed on lining 13 along one side of or at the ends of can 11 in order to impart a desirable smoked flavor to the cured meat forming the meat loaf of the present invention. Can 11, with lining 13 and rind 15 in place, is then telescoped upon the nozzle 10, said can being closed at one end as indicated at 16. Nozzle 10, preferably, has the same form as can 11 and is slightly smaller so that the telescoping of can 11 on nozzle 10 may be readily accomplished and the flowing of the meat mixture may take place under equal pressure throughout the entire cross-sectional area of the can.

The mixture is then fed progressively into the can 11 against the closed end 16 thereof causing the can to move away from and be stripped off the nozzle as it is filled. Inasmuch as certain of the pieces of meat are relatively large and since, preferably, a product of a size and cross-sectional form similar to that of a loaf of bread is to be produced, it has been found desirable to utilize a can and nozzle having a rectangular form. It is to be understood, however, that a can having any other desired form may be substituted for that illustrated in the drawing.

Prior to the initiation of the flow of meat into the can, the can 11 is telescoped over the nozzle 10 as pointed out above so that said can is supported thereby. If desired, however, the can may be supported by any suitably arranged guiding means disposed beneath it. The flow of meat is then initiated.

The meat is flowed into the can 11 against end 16 under pressure, which may be increased by resisting the endwise movement of the can away from the nozzle, so as to cause the meat to be re-shaped and assume a solid form approximating the form in cross-section of the can and entirely free of voids. A considerable pressure is preferably used in flowing the meat into the can. As a consequence, the meat mixture is forced against the walls of the can, and in the corners between the walls in such a manner that a homogeneous meat loaf free from pockets of meat juices or jelly, resulting from the cooking step, is obviated. This can be readily brought about because of the fact that the mixture is sufficiently plastic to be intimately united and to acquire the square or rectangular form of the can as illustrated. As the meat continues to flow from the nozzle into the can, the can 11 as well as lining 13 and rind 15 moves off of the nozzle 10 which supports them.

The meat is permitted to flow through the nozzle 10 until the can is filled when the flow of meat is cut off. The can 11 is then removed from the stuffing machine, the end 14 of lining 13 is folded over to enclose the exposed end of the meat, and the end 12 of can 11 is closed by soldering a closure 17 having a vent 18 therein upon the open end 12. The inner surface 19 of closure 17 overlying vent 18 is provided with an inwardly protruding cap 21 having a corrugated flange 22 lying against surface 19. Vent 18, therefore, will not be clogged by the meat product due to cap 21 and the steam and air pass through the corrugations in flange 22 and out through vent 18 during the cooking step.

The filled can is then placed in a suitable container and boiled until the meat is thoroughly cooked, preferably at a temperature of from 160 to 185 degrees C. Following the cooking action, the vent 18 is sealed by soldering the outer surface of closure 17 at 23 while the can 11 and its contents are still hot. The sealed can 11 is then chilled in a cooler maintained at a temperature of from 38 to 42 degrees C. so that the juices of the meat and the gelatin formed by the finely chopped knuckle and ligamentous portions of the comminuted hock and pelvic portions that coat the large pieces, will firmly unite the pieces of meat into a solid compact mass suitable for slicing purposes. The cooling of the can 11 also creates a vacuum in the can which aids in the preservation of the meat. In order to insure proper preservation of the cooked meat, the can should, however, be kept at a temperature of 38 to 42 degrees C. until used.

Preferably the product is produced in such form that in cross-section it will correspond substantially exactly to the cross-section of a loaf of bread, so that when the compacted meat of the present invention is subsequently removed from can 11 and sliced the slices, which will be of a unitary character, will exactly fit between slices of bread making the manufacture of sandwiches an extremely simple matter from the ham loaf or roll of the present invention.

Figure 5:
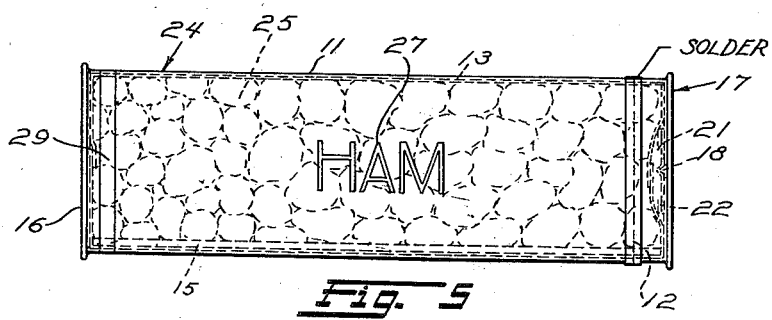
Figure 5 is a side elevational view of a boiled ham packaged in accordance with the present invention.
Figure 6:
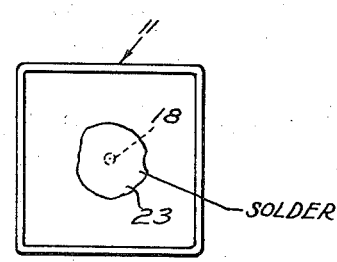
Figure 6 is an end elevational view of the completed package showing the vent after it has been sealed by soldering.

In its completed form the package will appear as illustrated in Figure 5 of the drawing, in which a package 24 is illustrated of an elongated form consisting of a can containing a solid meat loaf, formed of a multiplicity of relatively large pieces of ham or like meat 25 of the size of a walnut or hen's egg, firmly united or bound together by the gelatin resulting from cooking the finely divided knuckle and comminuted pelvic or hock portions of the meat.

The can 11 may have formed thereon suitable indicia 27 indicating the nature and origin of the products as may be desired. The package of the present invention provides an extremely sanitary manner of marketing a ham or like meat loaf of the character described which is readily maintained in sanitary condition until it is used, at which time the end 16 is removed by means of a key which is applied to the weakened area 29 surrounding the can adjacent end 16 in well known manner. In order to remove the meat loaf in an expeditious manner, the can 11 should, preferably, be subjected to a stream of warm water for a few seconds after removal of end 16. When this procedure is followed the loaf may be slid out of the can without damaging the product in any way.

The formation of the package, the curing, cooking and chilling of the product may be accomplished with expedition so that the food packages may be prepared at a relatively low cost. Since the completed product has a cross-section similar to that of a loaf of bread, and is of compact nature, it is extremely desirable for the purpose of making sandwiches.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The method of packaging a solid unitary loaf of ham or like pork products in a can which comprises the steps of separating the gelatinous hock and pelvic portions from the remaining portion of the meat, comminuting said hock and pelvic portions, cutting said remaining portion into relatively large pieces approximating the size of a hen's egg, mixing the large pieces and the comminuted hock and pelvic particles along with the knuckle which is previously chopped into an extremely fine condition, so that the comminuted particles coat the pieces with a binder, lining a can having an open end with parchment, placing a strip of smoked ham or bacon rind in the can and upon the parchment, stuffing said mixture progressively into the can from said open end and forcing it against the closed end of the can to mold the mixture to the shape of the can and intimately unite the pieces to each other and to said strip, closing the open end of the can with a vented closure, placing the filled can in a vat of hot water to cook the mixture, removing the can from the vat when the mixture is sufficiently cooked and sealing the vent while the can and the mixture is still hot, and subjecting the sealed can to a relatively low temperature until used to thereby chill the meat, set the gelatinous matter and produce a vacuum in the sealed can.

2. A packaged ham or like food product comprising a can, a piece of smoked meat rind or the like disposed in said can and a mixture of relatively large pieces and comminuted cured gelatinous particles of meat formed into a meat loaf of substantially uniform consistency, said particles binding said pieces to each other and to said rind, said mixture and said rind forming a meat product completely enclosed by said can.

CHARLES H. VOGT.